United States Patent [19]

Frencken et al.

[11] Patent Number: 5,102,608
[45] Date of Patent: Apr. 7, 1992

[54] METHOD FOR THE MANUFACTURE OF OBJECTS FROM POLYCARBONATE

[75] Inventors: Eduard J. Frencken, Stein; Martin J. P. Flinsenberg, Sittard, both of Netherlands

[73] Assignee: Stamicarbon B.V., Geleen, Netherlands

[21] Appl. No.: 635,314

[22] Filed: Jan. 3, 1991

[30] Foreign Application Priority Data

Jan. 3, 1990 [NL] Netherlands ......................... 9000006

[51] Int. Cl.$^5$ ..................... B29C 43/00; B29C 45/00
[52] U.S. Cl. .................................. 264/328.1; 264/1.3; 264/328.17; 264/331.21
[58] Field of Search ............ 264/1.3, 106, 107, 328.1, 264/328.17, 331.21

[56] References Cited

U.S. PATENT DOCUMENTS 4,434,118  2/1984  Lim ..................................... 264/109
4,514,357  4/1985  Kawaguchi et al. ............... 264/106

Primary Examiner—James Lowe
Attorney, Agent, or Firm—Cushman, Darby & Cushman

[57] ABSTRACT

A process for the manufacture of objects by injection molding and/or compression molding starting from polycarbonate powder. The process is suitable for, inter alia, the manufacture of carriers for optically readable information such as audio and video discs.

9 Claims, No Drawings

METHOD FOR THE MANUFACTURE OF OBJECTS FROM POLYCARBONATE

BACKGROUND OF THE INVENTION

The invention relates to a method for the manufacture of objects from polycarbonate by, inter alia, injection molding and/or compression molding. The method is suitable for the manufacture of carriers for optically readable information, such as audio and video discs.

One of the publications in which such a method has been described is Kunststoffe 77 (1987) 1, pp. 21–26, which indicates how carriers for optically readable information, such as compact discs, can be manufactured from polycarbonate granulate.

An optically readable information carrier may consist of a plastic disc, made from polycarbonate, one of whose parallel surfaces is provided with optically readable information in the form of a surface structure track of pits. The dimensions of these pits as well as the distances between them usually are of the order of magnitude of 1 to 2 micrometers. The optically readable information is covered by an internally reflecting mirroring layer, for instance an aluminum or silver layer, such that a laser beam entering the information carrier through the other surface reaches the structure track, after travelling a certain path, depending on the carrier's thickness, after which the laser beam scans this track, and is then reflected by the mirroring layer. The reflected beam, converted into an intermittent light beam due to the presence of pits, forms a signal for further processing into images and/or sound. Suitable carriers should preferably be free of double refraction caused by molecular orientation and should be of uniform thickness in all directions.

The carrier material has a stronger tendency to cause double refraction of a light beam when its surface structure is more irregular, and such double refraction decreases the probability of the reflected beam being processed as a signal. Double refraction, the phenomenon of a light beam with a certain wavelength being split into two components, each with a different refractive index, when it enters a medium, strongly decreases the probability of the reflected beam being converted into images and/or sound. The degree to which this probability decreases is determined also by the thickness of the carrier material, or the length of the path to be traversed by the beam after refraction by the carrier material. Irregularities in the thickness created during the manufacture of the disc material also have a negative effect on the quality of the images and/or sound. The same holds true for entrapped contaminations, which also affect the reflected beam. A practical requirement that may be imposed on carriers of optically readable information is that the optical path length difference, represented by $\Delta n \times d$, is less than 50 nanometers, preferably less than 25 nanometers, $\Delta n$ being the difference in refractive index of the light components and d the thickness of the carrier, expressed in nanometers. Further requirements are that, for stiffness reasons, the polycarbonate carrier has a thickness between 1.0 and 1.3 mm. For a compact disc, the thickness preferably is between 1.05 and 1.15 mm, and for purposes of standardization, the thickness is about 1.1 mm.

For the manufacture of compact discs and video discs by, for instance, the injection molding process, use is made of polycarbonate with a relatively low molecular weight. The polycarbonate should also have a low viscosity level to ensure compact discs or videodiscs are obtained that have a low level of double refraction, so that optimum information transfer via the laser beam is guaranteed. All this can be realized only when the material temperature during manufacture is relatively high, e.g., up to 360° C., and when the polycarbonate has a low molecular weight. Several patent applications describe a method of achieving the above requirements by improving the thermal stability of the polycarbonate by adding end stabilizers (see e.g. Japanese patent application JP 2064–860).

One of the main problems, in spite of the thermal stabilization, is the occurrence of small black specks in the produced compact discs, which leads to a high percentage of rejects. These black specks are caused by carbonized polycarbonate particles formed during compounding of the polycarbonate granulate from the polycarbonate powder. To prevent the occurrence of these black specks and to remove them, special stabilization systems and filters are required in the polycarbonate melt just before the extruder head. Nevertheless, the percentage of granulate and, as a result, the percentage of compact discs that are rejected, remain substantial.

Black specks are a problem not only for carriers of optically readable information. They are a general problem encountered in the manufacture of objects from polycarbonate, often causing a high percentage of rejects.

SUMMARY OF THE INVENTION

It has now been found that the above problems can largely be prevented by using polycarbonate powder, preferably polycarbonate powder having a high bulk density, for the manufacture of an object, by either an injection or compression molding process. The method found is of particularly great advantage in the manufacture of carriers for optically readable information, specifically in the manufacture of compact discs and video discs.

The invention is directed to a method of manufacturing objects by injection molding or compression molding using a polycarbonate powder having a bulk density of 200–900 kg/m$^3$. In particular, the invention relates to a method of manufacture using polycarbonate powder having a bulk density of 400–700 kg/m$^3$. In a specific embodiment, the invention relates to the manufacture of carriers for optically readable information, such as audio and video discs.

DETAILED DESCRIPTION OF THE INVENTION

Polycarbonate powders that are suitable for the purpose of this invention are polycarbonate powders with a bulk density of 200–900 kg/m$^3$. Very suitable are powders having a bulk density of 400–700 kg/m$^3$, this bulk density being comparable to that of granulate.

In addition, these powders have a higher thermal stability with not a single thermal treatment being necessary, and the addition of stabilizers being virtually superfluous. A thermal stabilizer content of 0.003–0.05 wt. % is sufficient.

Thermal stabilizers often employed for this purpose are organic phosphorus compounds. Such compounds, however, have the disadvantage that in the long run they cause the hydrolysis stability of the final product to deteriorate. The present invention also eliminates this problem.

The polycarbonates may be prepared in the customary manner by the interfacial polymerization process of conversion of a bivalent phenol with a carbonate pre-product.

Examples of some bivalent phenols that can be used are:

4,4'-dihydroxybiphenyl;
2,2-bis(4-hydroxyphenyl)propane (bisphenol A);
2.2-bis(4-hydroxy-3-methylphenyl)propane;
2,2-bis-(3-chloro-4-hydroxyphenyl)propane;
2,2-bis-(3,5-dimethyl-4-hydroxyphenyl)propane;
2,4-bis-(4-hydroxyphenyl)-2-methylbutane;
2,4-bis(3,5-dimethyl-4-hydroxyphenyl)-2methylbutane;
4,4-bis(4-hydroxyphenyl)heptane; bis-(3,5-dimethyl-4-hydroxyphenyl)-methane;
1,1-bis-(4-hydroxyphenyl)-cyclohexane;
1,1-bis-(3,5-dimethyl-4-hydroxyphenyl)-cyclohexane;
2.2-(3,5,3', 5'-tetrachloro-4,4'-dihydroxydiphenyl)propane;
2,2-(3,5,3', 5'-tetrabromo-4,4'-dihydroxydiphenyl)propane;
(3,3'-dichloro-4,4'-dihydroxyphenyl)methane; bis-(3,5-dimethyl-4-hydroxyphenyl)sulphone; bis-4-hydroxyphenylsulphone; and bis-4hydroxyphenylsulphide.

Among the bivalent phenols listed above, bisphenol A is the most preferred.

The carbonate pre-product may be a carbonyl halide, a halogen formate or a carbonate ester. Examples of carbonyl halides are carbonyl chloride and carbonyl bromide. Examples of halogen formates that can be used are bis-halogen formates of bivalent phenols such as hydroquinone or of glycols such as ethylene glycol. Examples of carbonate esters that can be applied are diphenyl carbonate, di(chlorophenyl)carbonate, di(bromophenyl)carbonate, di(alkylphenyl) carbonate, phenyltolyl carbonate, etc., and mixtures thereof. Though other carbonate pre-products may also be applied, the carbonyl halides are preferred, and, in particular, preference is given to carbonyl chloride, also known as phosgene.

The polycarbonate resin used in the invention can be prepared by using a catalyst, an acid acceptor and a compound for controlling the molecular weight.

Examples of catalysts are tertiary amines such as triethyl amine, tripropyl amine and N,N-dimethyl aniline, quaternary ammonium compounds such as tetraethyl ammonium bromide and quaternary phosphonium compounds such as methyl triphenyl phosphonium bromide.

Examples of organic acid acceptors are pyridine, triethyl amine, dimethyl aniline, etc. Examples of inorganic acid acceptors are hydroxides, carbonates, bicarbonates and phosphates of an alkali metal or alkaline earth metal.

Examples of compounds for controlling the molecular weight are monovalent phenols such as phenol and alkyl-substituted phenols such as paratert butyl-phenol and further secondary amines.

Use can also be made of other additives customary in polycarbonate resins. These include mold release agents, such as stearates; thermal stabilizers, such as organic phosphorus compounds; as well as stabilizers against hydrolysis.

The invention will be elucidated on the basis of the following examples.

Preparation of the polycarbonate resin 300 parts by weight of bisphenol A and 8.1 parts by weight of para-tertiary butyl-phenol were suspended in 1 liter of water in a flask provided with a stirrer and a gas inlet tube. The oxygen was removed from the reaction mixture by passing nitrogen through the mixture for 20 minutes, the mixture meanwhile being stirred. Subsequently, 250 parts by weight of 43 wt. % caustic soda and 650 parts by weight of methylene chloride were added. The mixture temperature was brought to 25° C. and kept at this value by cooling. In 90 minutes 160 parts by weight of phosgene were introduced. 20 minutes after the start of phosgene introduction, another 50 parts by weight of caustic soda were added.

To the resulting solution 1 part by weight of triethyl amine was added, following which the mixture was stirred for 20 minutes. Additional methylene chloride was added to reduce the viscosity of the strongly viscous solution. The water-rich phase was separated off, and the organic phase was washed with water until no more salt was present in the organic phase. The polycarbonate product was isolated from the solution and dried into a powder.

The polycarbonate powder obtained had a visoosity of 1.23, measured in a 0.5 wt. % solution dissolved in methylene chloride. This corresponds to a molecular weight of approximately 17,000.

Comparative Example A

Comparative Examples A and B exemplify conventional processes. 10 kg of the powder prepared as described in the above section, together with 0.05 wt. % IRAGAFOS 168 (registered trademark of Ciba-Geigy)(an organic phosphite with the structure tris-(2,4-ditertbutylphenyl) phosphite) as a thermal stabilizer, was compounded into granulate using a W&P-30 twin-screw extruder. The screw speed was 300 rpm, the output 15 kg/h, and the temperature settings of the extruder cylinder were between 270° C. and 290° C. The extruder head had a mesh screen package to filter black specks from the melt. The resulting granulate was processed into compact discs using an injection molding machine specially developed for this purpose by Meiki, which machine is characterized by optimum residence time control and injection molding precision. Of the compact discs made, 14% were rejected upon quality inspection because of the presence of black specks.

Comparative Example B

In the same way as described in Comparative Example A, compact discs were made from granulate, the only difference being that this time a so-called melt filter, made by Fluid Dynamics and having a pore opening of 5 microns, had been installed in the extruder. This filter has been developed especially for removal of black specks from a polymer melt. Of the compact discs made 4% were rejected because of black specks.

EXAMPLE I

Using the same injection molding machine as in Comparative Example A, a polycarbonate powder, prepared in the way described above in the section entitled "Preparation of the polycarbonate resin", with an IRGAFOS 168 (tris-(2,4-ditentbutyl-phenyl) phosphite) content of 0.05 wt. % and a bulk density of 643 kg/m$^3$, was directly molded into compact discs. Of the compact discs produced, 1% were rejected because of black specks.

EXAMPLE II

Using the same injection molding machine as in Comparative Example A, a polycarbonate powder, prepared in the way described above, with an IRGAFOS 168 (tris-(2,4-ditentbutyl-phenyl) phosphite) content of 0.03 wt. %, was directly molded into compact discs. Of the compact discs produced 1% were rejected because of black specks.

EXAMPLE III

In the same way as in Example II, polycarbonate powder with an IRGAFOS 168 (tris-(2,4-ditentbutyl-phenyl) phosphite) content of 0.01% was directly molded into compact discs. Upon quality inspection 1% of the compact discs produced were rejected because of black specks.

Test method

The Visual Inspection Ratio (VIR) of both the powder used in Examples I, II and III and the granulate used in Comparative Examples A and B was determined as follows: 2 kg material was placed on a light box and the number of black specks was counted during 5 minutes. The VIR was defined as follows:

a = number of black specks found with $d > 1$ mm
b = number of black specks found with $0.05 < d < 1$ mm
c32 number of black specks found with $d < 0.05$ mm
$VIR = 5xa + 2xb + c$ In the same way, the number of black specks was determined in the compact discs made in Examples I, II and III and Comparative Examples A and B.

The results of the tests performed are shown in the table below.

TABLE

| Example | VIR of starting material | VIR of compact discs | Rejected compact discs (%) |
|---|---|---|---|
| A | 8 | 10 | 14 |
| B | 3 | 4 | 4 |
| I | 0 | 1 | 1 |
| II | 0 | 1 | 1 |
| III | 0 | 2 | 1 |

The above table shows a much higher occurrence of black specks, as measured by VIR, in Examples A and B, representing conventional processes, when compared to Examples I, II and III, representing the process of the present invention.

In particular, there is a startling difference in number of black specks in the respective starting materials. The granulate starting material of Examples A and B have VIR values of 8 and 3 compared to VIR values of zero for the powder starting material of the present invention, i.e., Examples I, II and III.

With respect to the compact disc VIR values shown in the table, even the best (lowest) VIR value of the conventional processes, Example B having a VIR value of 4, is twice as high as the worst (highest) VIR value of the present process, Example III with a VIR value of 2.

Based on percent rejection of resulting compact discs, from the Examples (using visual observation of black specks), the process of the present invention is clearly superior to the conventional processes, resulting in far fewer rejects.

We claim:

1. A process for the production of molded articles substantially free of dark specks which comprises:
   molding a polycarbonate powder having a bulk density of from 200 to 900 kg/m$^3$ into a molded article.

2. A process according to claim 1 wherein said molding is injection molding.

3. A process according to claim 1 wherein said molding is compression molding.

4. A process according to claim 1 wherein said polycarbonate powder has a bulk density of 400–700 kg/m$^3$.

5. A process according to claim 1 wherein said polycarbonate powder includes a thermal stabilizer, the content of which is less than 0.05 wt. %.

6. A process according to claim 1 wherein said polycarbonate powder includes a thermal stabilizer, said stabilizer comprising tris-(2,4-ditertbutylphenyl)-phosphite.

7. A process according to claim 1 wherein said polycarbonate is prepared by conversion of a bivalent phenol with a carbonate pre-product employing interfacial polymerization.

8. A process according to claim 7 wherein said bivalent phenol is 2,2'-bis(4-hydroxyphenyl) propane.

9. A process according to claim 7 wherein said carbonate pre-product material is selected from the group consisting of carbonyl halide, halogen formate and carbonate ester.

* * * * *